(12) United States Patent
Huang

(10) Patent No.: US 9,016,676 B2
(45) Date of Patent: Apr. 28, 2015

(54) ADJUSTING DEVICE OF WAFER MACHINE

(76) Inventor: Yung-Chiu Huang, New Taipei (TW)

( * ) Notice: Subject to any disclaimer, the term of this patent is extended or adjusted under 35 U.S.C. 154(b) by 894 days.

(21) Appl. No.: 13/234,156

(22) Filed: Sep. 16, 2011

(65) Prior Publication Data

US 2013/0069295 A1    Mar. 21, 2013

(51) Int. Cl.
| | | |
|---|---|---|
| *B23Q 1/25* | (2006.01) | |
| *B23Q 3/18* | (2006.01) | |
| *B25B 1/20* | (2006.01) | |
| *B23Q 1/64* | (2006.01) | |
| *B23Q 35/46* | (2006.01) | |

(52) U.S. Cl.
CPC . *B23Q 1/64* (2013.01); *B23Q 35/46* (2013.01); *B23Q 3/18* (2013.01)

(58) Field of Classification Search
CPC ............ B23Q 1/64; B23Q 1/522; B23Q 1/03; B23Q 1/48; B23Q 3/18; B23Q 35/46; B23Q 35/102

USPC .......... 269/55, 56, 225, 43, 45, 143, 246, 249
See application file for complete search history.

(56) References Cited

U.S. PATENT DOCUMENTS 3,608,854 A * 9/1971 Hamu ........................ 248/316.1
6,397,402 B1 * 6/2002 Holland et al. ................... 2/467

* cited by examiner

*Primary Examiner* — Lee D Wilson
*Assistant Examiner* — Seahee Yoon
(74) *Attorney, Agent, or Firm* — Leong C. Lei

(57) ABSTRACT

The present invention relates to an adjusting device of wafer machine, which includes a rotary adjustment assembly that is rotatable to cause the rotation of a rod so as to displace a support block thereby elevating or lowering a support post. A balance board is thus caused to move a wafer substrate so as to realize balancing of wafer through the support post, whereby efficient adjustment of the wafer machine to a balanced position can be achieved without extra expense of time in adjustment operation and thus accelerating the time of manufacturing process and providing extremely high precision and further effectively reducing the potential risk of damage caused by over-adjustment.

9 Claims, 16 Drawing Sheets

ADJUSTING DEVICE OF WAFER MACHINE

(a) TECHNICAL FIELD OF THE INVENTION

The present invention generally relates to an adjusting device of wafer machine, and more particularly to providing a plane with a third fulcrum body and a plurality of carrying bodies and precise adjustment of a wafer machine through the carrying bodies.

(b) DESCRIPTION OF THE PRIOR ART

The technology of wafer manufacturing is now mature and this establishes the wafer kingdom nowadays. The manufacturing process of wafer often employs a number of machines to perform the process. In respect of the formation of a wafer, a wafer substrate is placed in a reaction chamber and a thin film is grown in a high temperature. A specific gas must be included. However, due to various factors of restriction, the growth rate of the thin film may be different, leading to difference in thickness and potential risk of exceeding acceptable tolerance. Thus, secondary balance adjustment of wafer surface must be carried out in order to make the thin film on the wafer substrate well within the tolerance range. A commonly used measure for adjusting the height of each point of wafer substrate carrying body is using a nut to perform rotary adjustment of the height. Since the adjustment of height must be carried out in a very precise manner, a skilled person often rely on his or her experience to only roughly adjust the nut to an acceptable range. The consequence is often thus the result of adjustment is not in a complete balance condition, leading to flaws. Another problem is that an inexperienced operator may take an excessive tightening of the nut, leading to undesired damage of the nut and further causing rusting of screw, which must be then cut off before disassembling can be proceed with and thus causes complicated problems.

SUMMARY OF THE INVENTION

The primary objective of the present invention is to use a third fulcrum body and a plurality of carrying bodies to carry out balancing operation of a wafer received in a reaction chamber through a balance board. The carrying bodies have such a structure that forms a planar surface at a predetermined location. The planar surface forms therein a vertical hole that receives therein a support post. The vertical hole is in communication with a receiving compartment that receives therein a support block. The receiving compartment is also in communication with a horizontal hole formed in one side of the carrying body. The horizontal hole receives therein a rod. The rod has an end that is coupled to the support block to provide forward and/or rearward movement to the support block. The carrying body comprises a rotary adjustment assembly arranged at one side thereof. The rotary adjustment assembly is coupled to an end of the rod that is distant from the support block to provide rotation to the rod. The rotary adjustment assembly comprises a mounting base that is securely mounted to the carrying body and the mounting base receives the rod to extend therethrough. The mounting base is circumferentially surrounded by a rotary switching member. The mounting base comprises a toothed disk seat arranged thereon. The toothed disk seat has a top surface forming teeth along a circumference thereof. The teeth mate a toothed disk that is arranged on the toothed disk seat and forms an engagement section. The toothed disk comprises a spring plate arranged thereon. Further, the mounting base, the toothed disk seat, the toothed disk, and the spring plate are all received in a rotary collar. The rotary collar is fit to a hand grip. As such, to perform a balancing operation of the wafer substrate, the balance board that is positioned on the third fulcrum body and the carrying bodies is adjusted by rotating the rotary adjustment assemblies with the third fulcrum body serving as a support reference. During the adjustment process, a user uses his or her hand to grip the hand grip, and then rotates the rotary adjustment assembly. Under this condition, the rod is rotated to have the support block moved due to threading engagement and pushing the support post to elevate, or the support block is caused to retract so as to lower the support post, thereby driving the balance board to move upward or downward and thus realizing balancing adjustment of the wafer substrate. With the above described technology the problems of the conventional wafer balance adjustment techniques that a skilled operator often relies on his or her experience to only roughly adjust a nut to an acceptable range and thus leading to that situation that the result of adjustment is not in a complete balance condition and flaws may be induced can be solved; and that another problem of the conventional techniques is that an inexperienced operator may take an excessive tightening of the nut thereby leading to undesired damage of the nut and further causing rusting of a screw, which must be cut off before disassembling can be made and thus causes undesired complicated problems, can both be overcome, whereby an efficient operation of adjusting and reaching a balanced position can be carried out without extra expense of time in the adjustment operation thereby accelerating the time of manufacturing process and providing extremely high precision and further effectively reducing the potential risk of damage caused by over-adjustment. Further, the inclined design of the contact section of the third fulcrum body allows it to depress the balance board so as to overcome the problem induced by spring fatigue.

Another objective of the present invention is to provide a third fulcrum body in the form of spherical pivoting ball (ball joint), so that the third fulcrum body is set in a pivotal engagement with the balance board. The balance board forms an arrangement of three point support that allows of universal movement.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
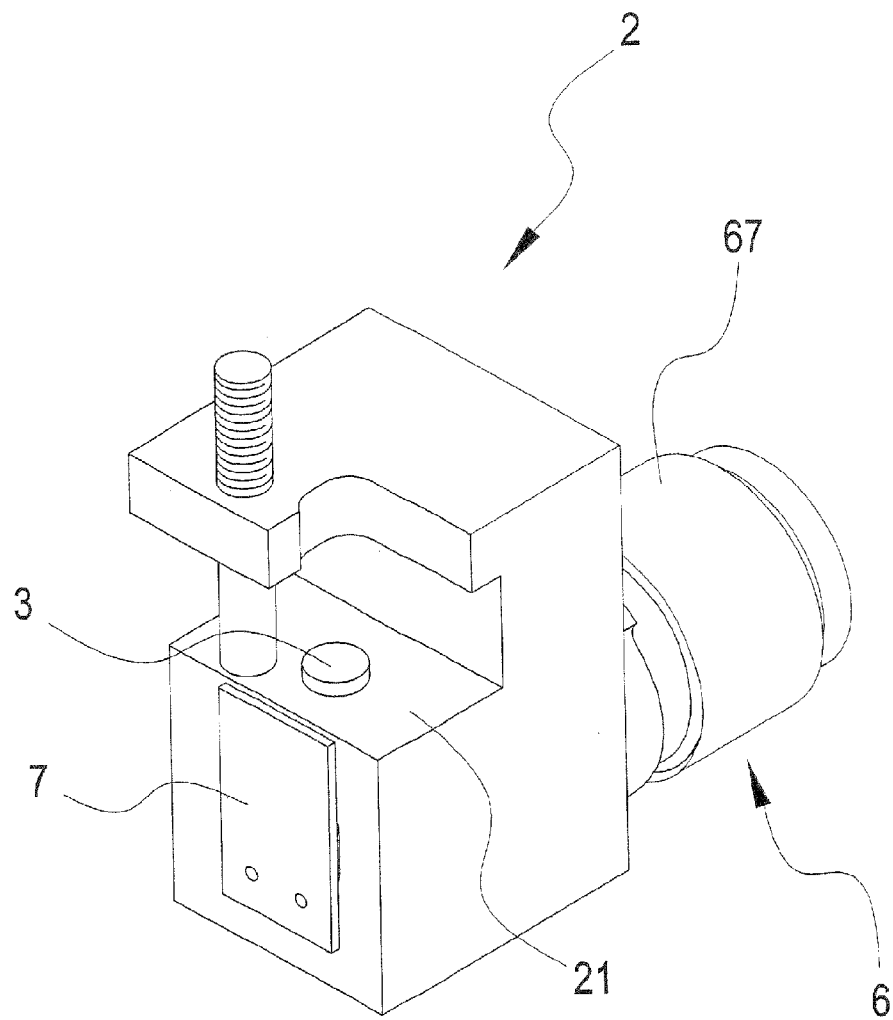
FIG. 1 is a perspective view showing a preferred embodiment according to the present invention.
Figure 2:
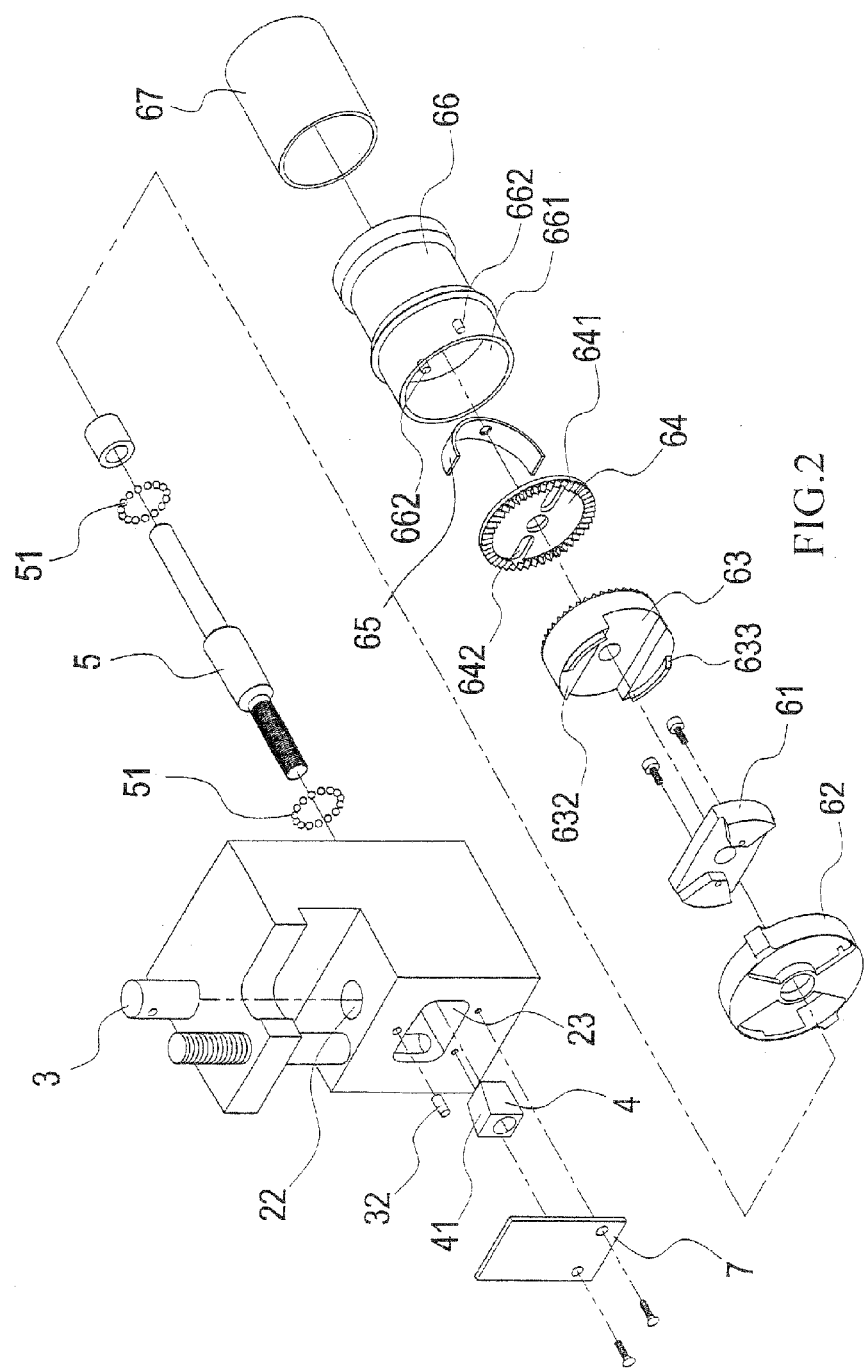
FIG. 2 is an exploded view showing the preferred embodiment according to the present invention.
Figure 3:
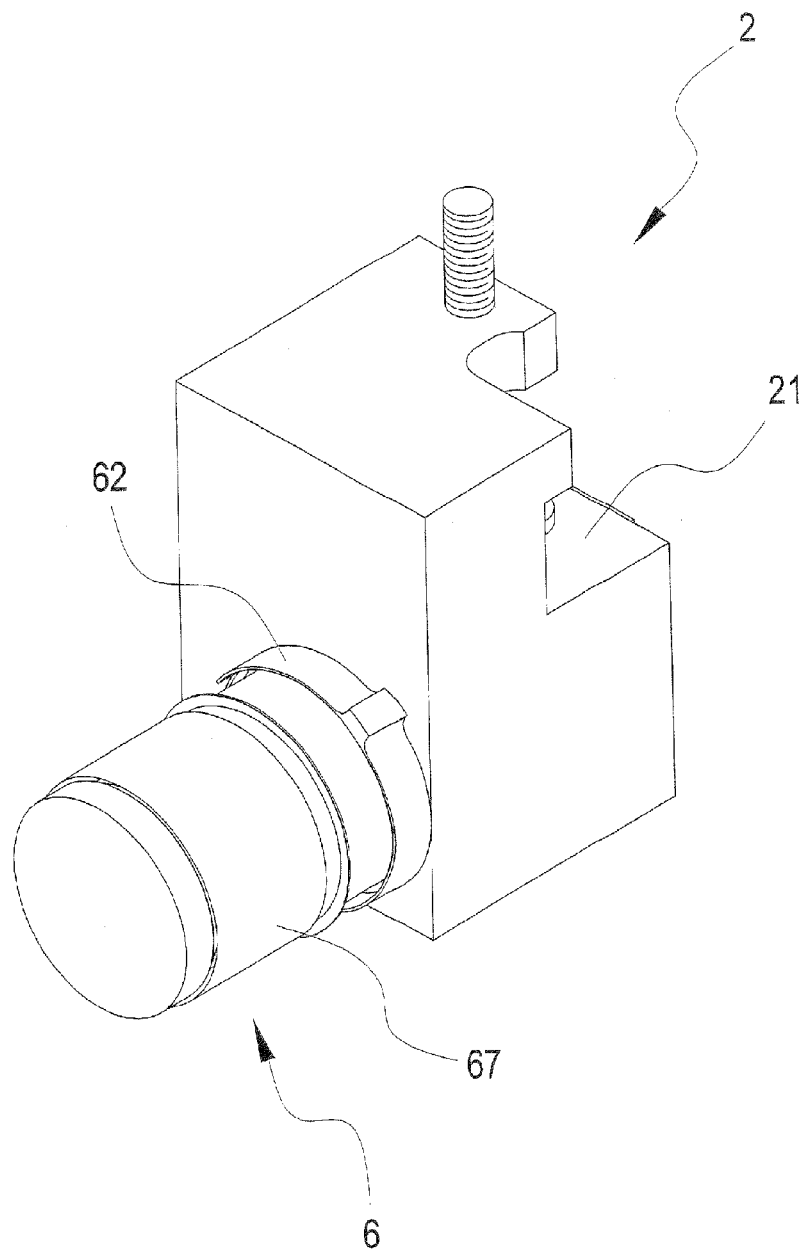
FIG. 3 is another perspective view showing the preferred embodiment according to the present invention.
Figure 3A:
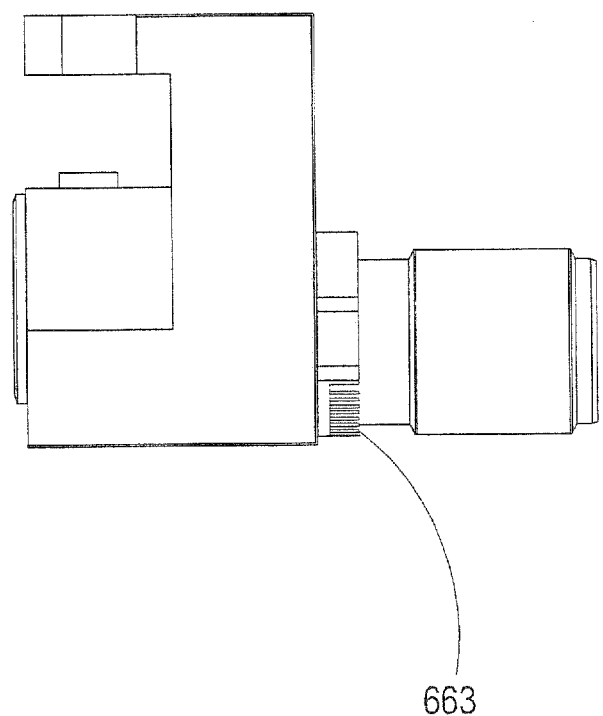
FIG. 3A is a side elevational view showing the preferred embodiment according to the present invention.
Figure 4:
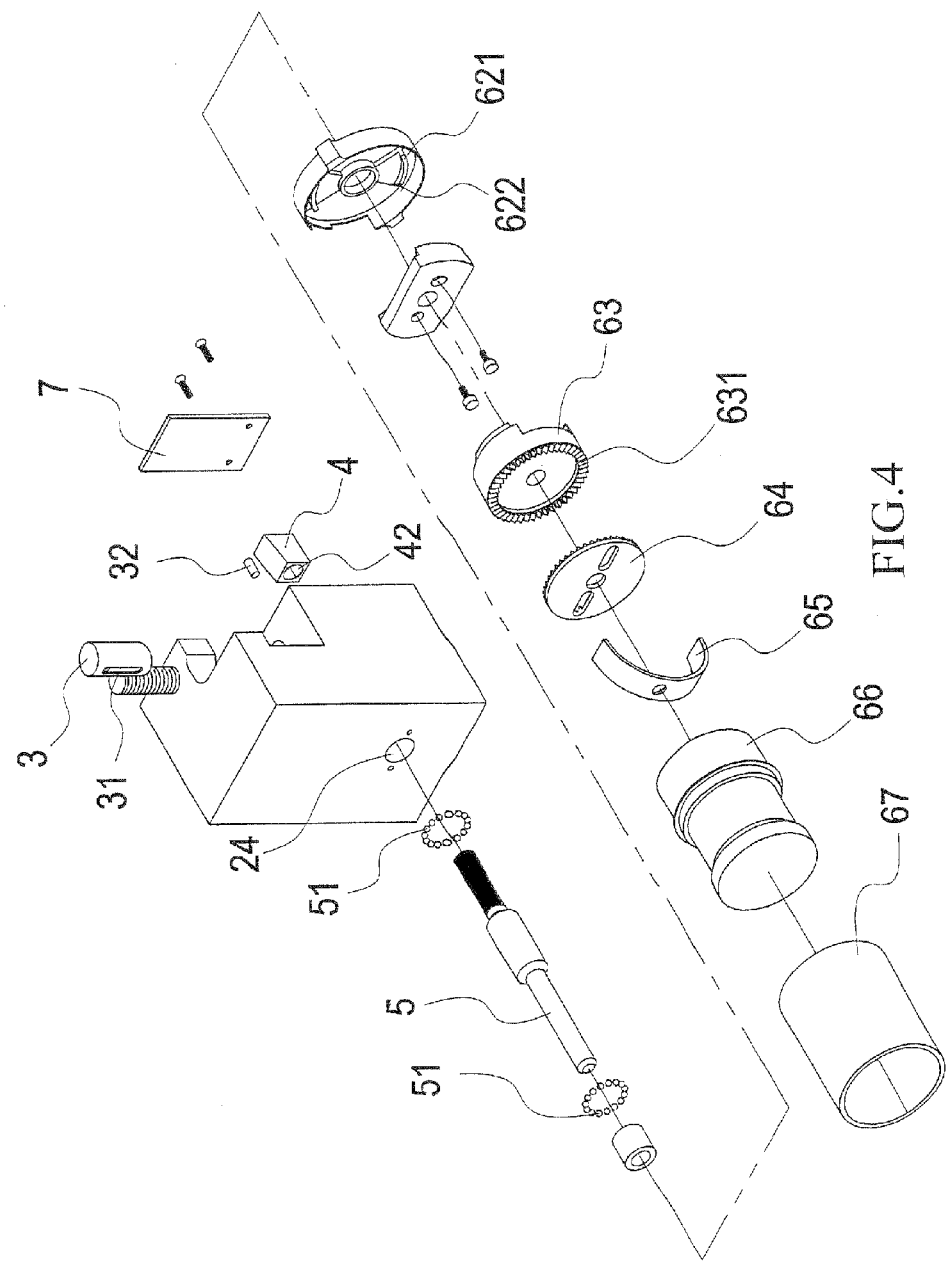
FIG. 4 is another exploded view showing the preferred embodiment according to the present invention.
Figure 5:
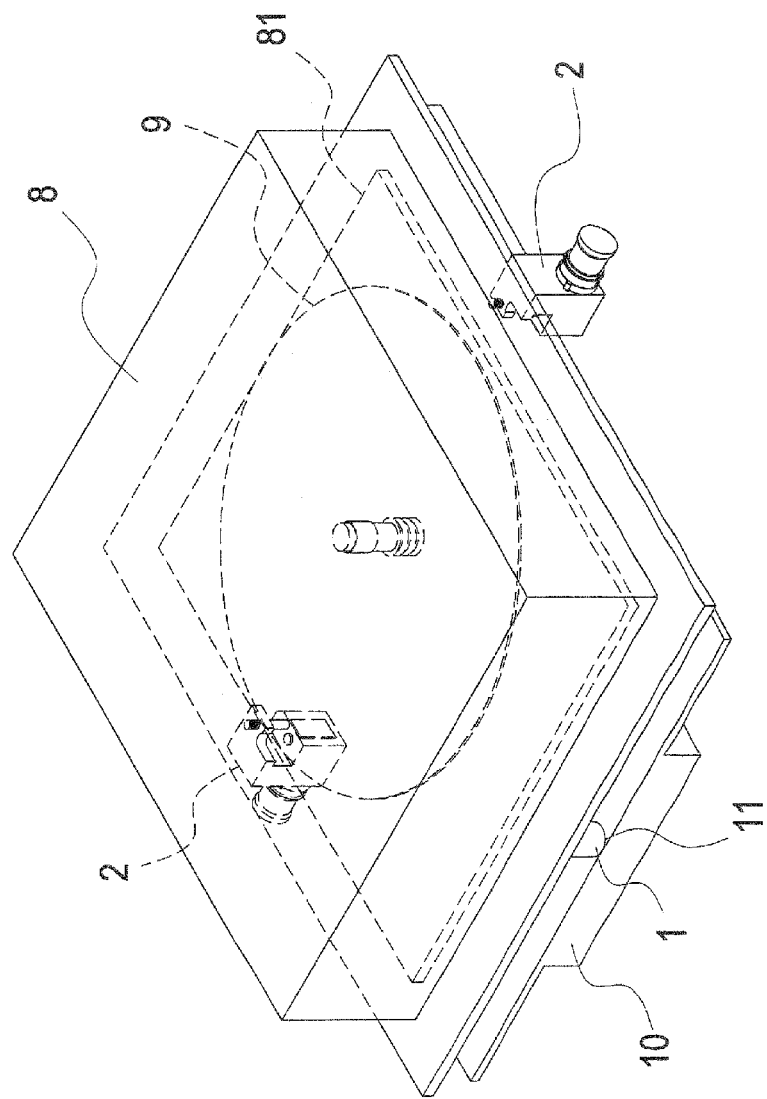
FIG. 5 is a perspective view showing an application of the present invention.
Figure 5A:
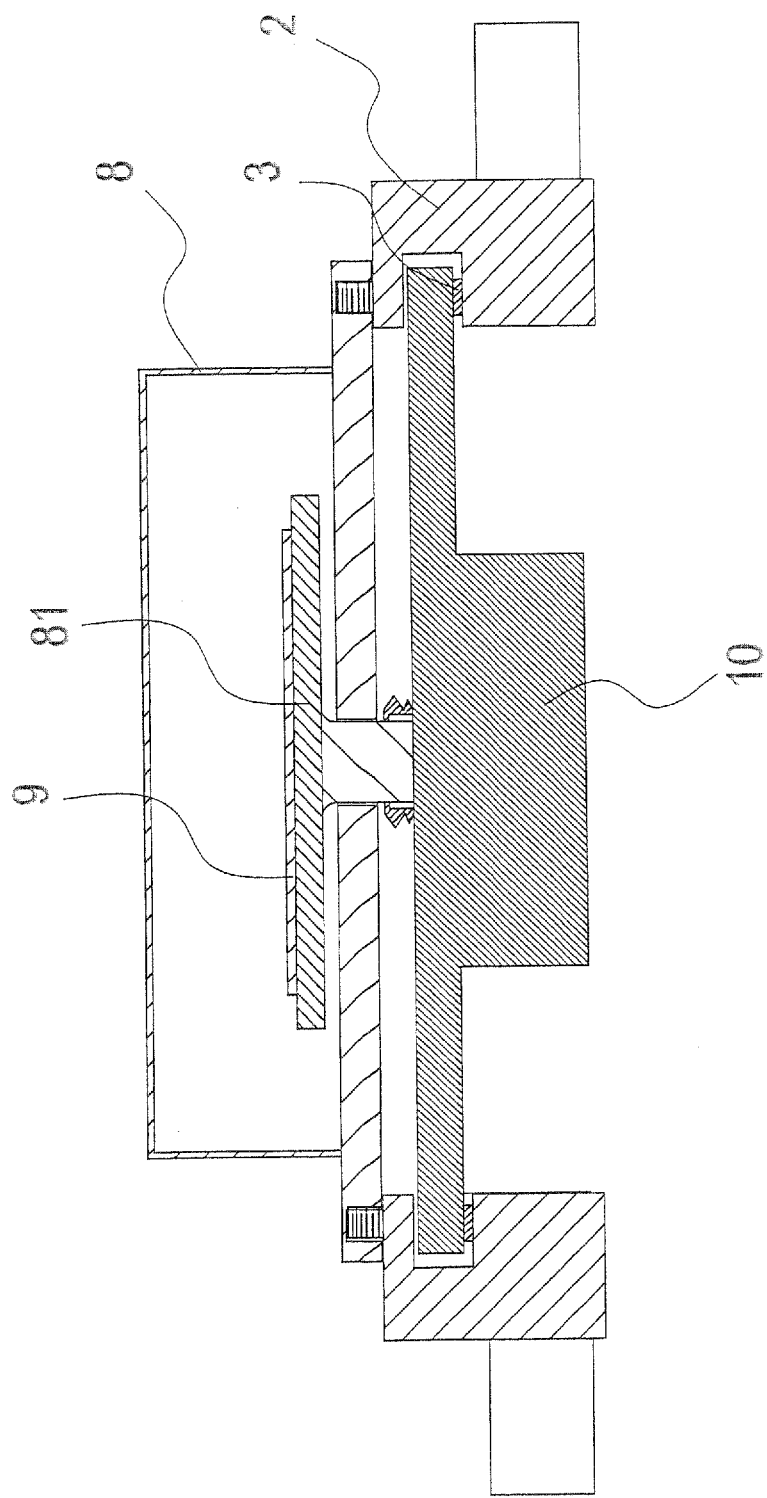
FIG. 5A is a cross-sectional view showing an application of the present invention.
Figure 5B:
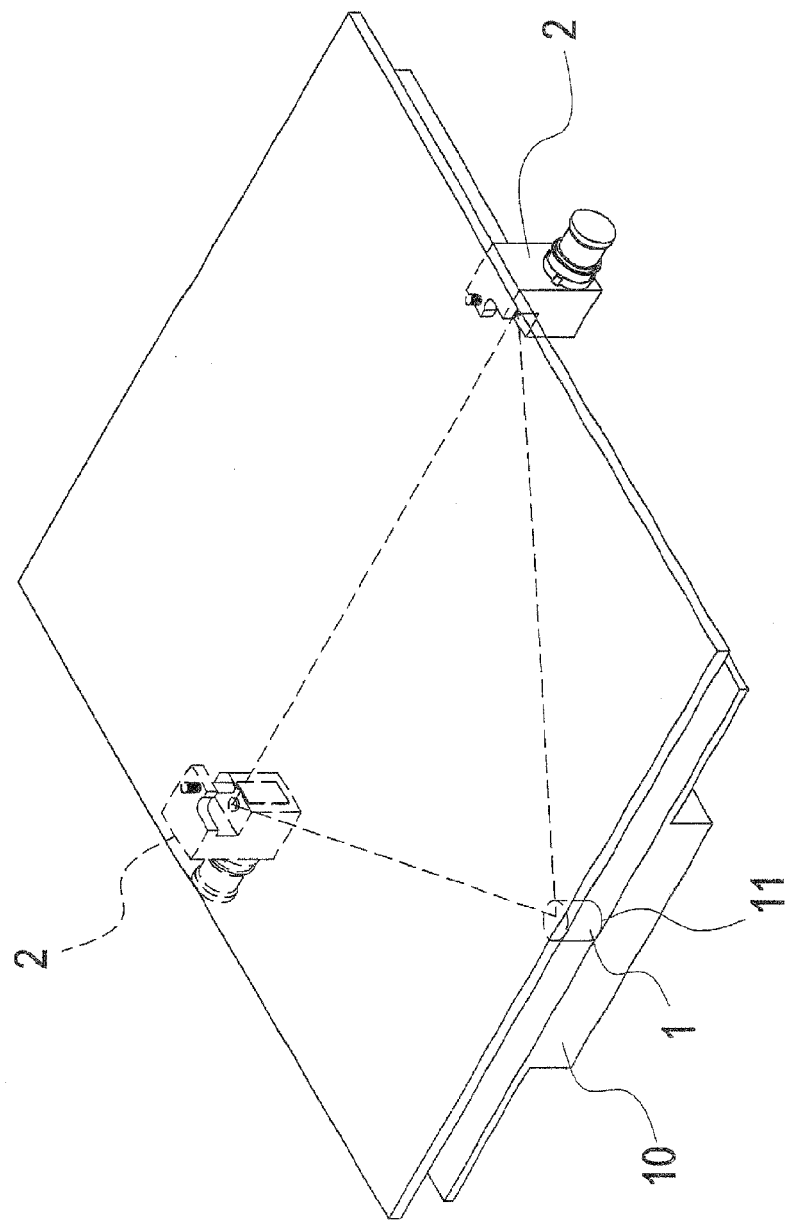
FIG. 5B a perspective view demonstrating three-point balance according to the present invention.
Figure 6:
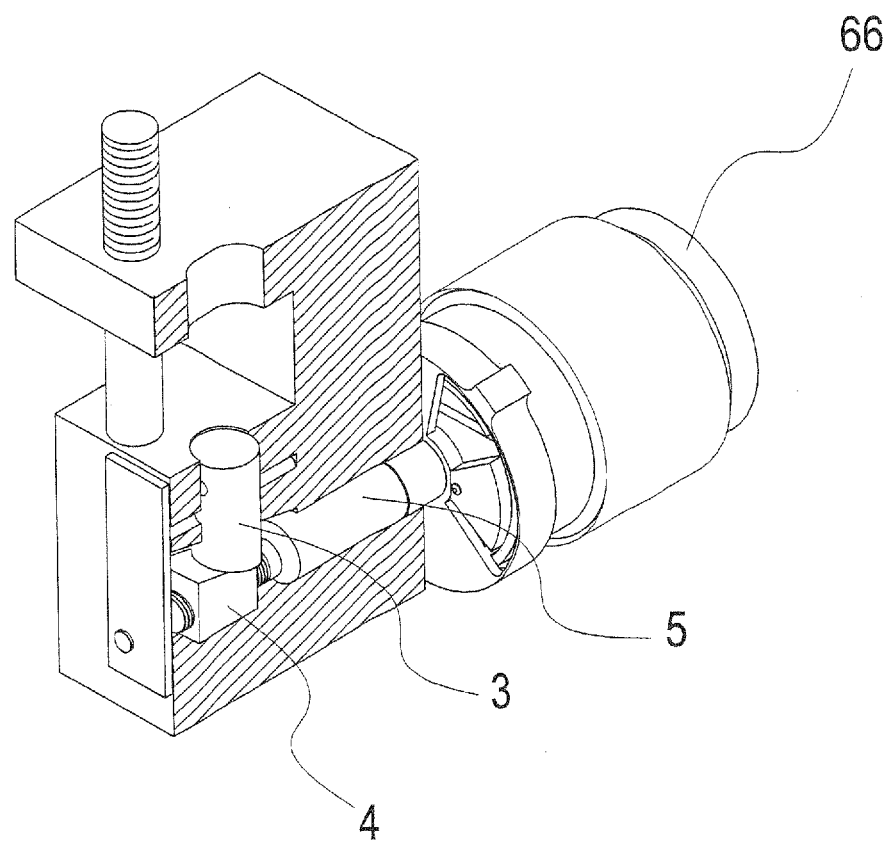
FIG. 6 is a view demonstrating an operation of the preferred embodiment of the present invention.
Figure 7:
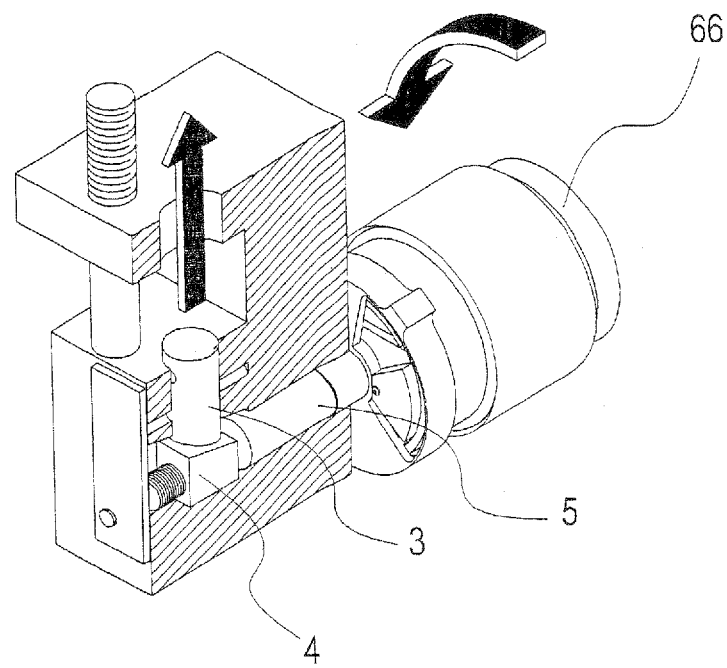
FIG. 7 is a view demonstrating an operation of the preferred embodiment of the present invention.
Figure 8:
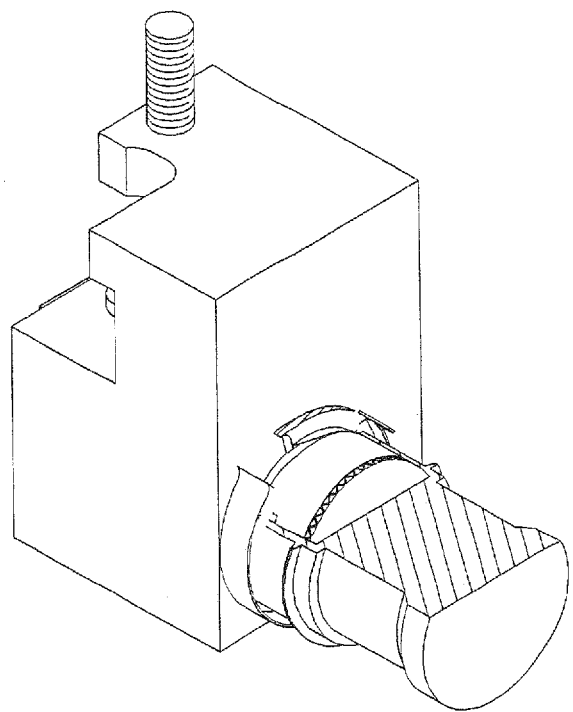
FIG. 8 is a view demonstrating an operation of the preferred embodiment of the present invention.
Figure 8A:
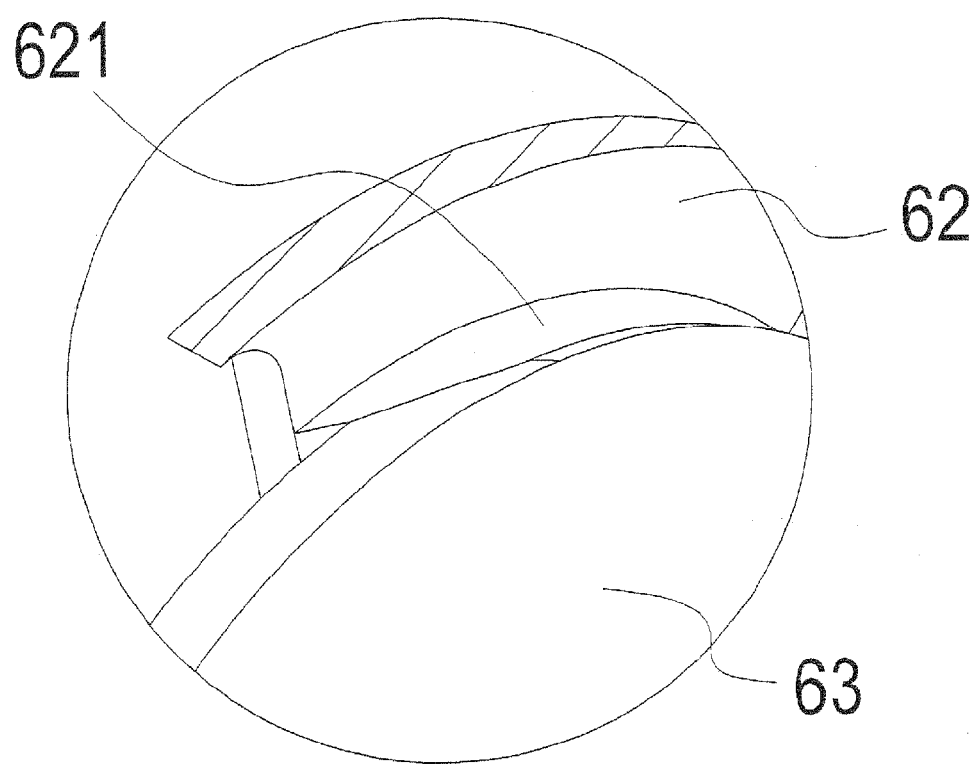
FIG. 8A is an enlarged view of a portion of FIG. 8.
Figure 9:
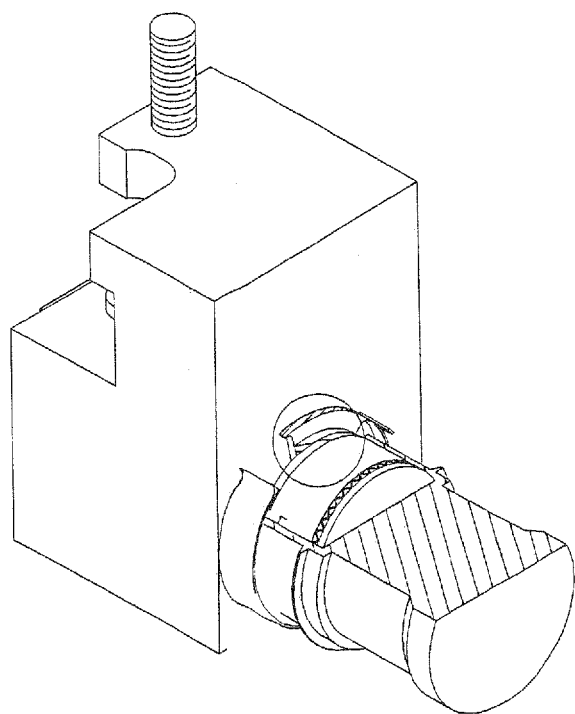
FIG. 9 is a view demonstrating an operation of the preferred embodiment of the present invention.
Figure 9A:
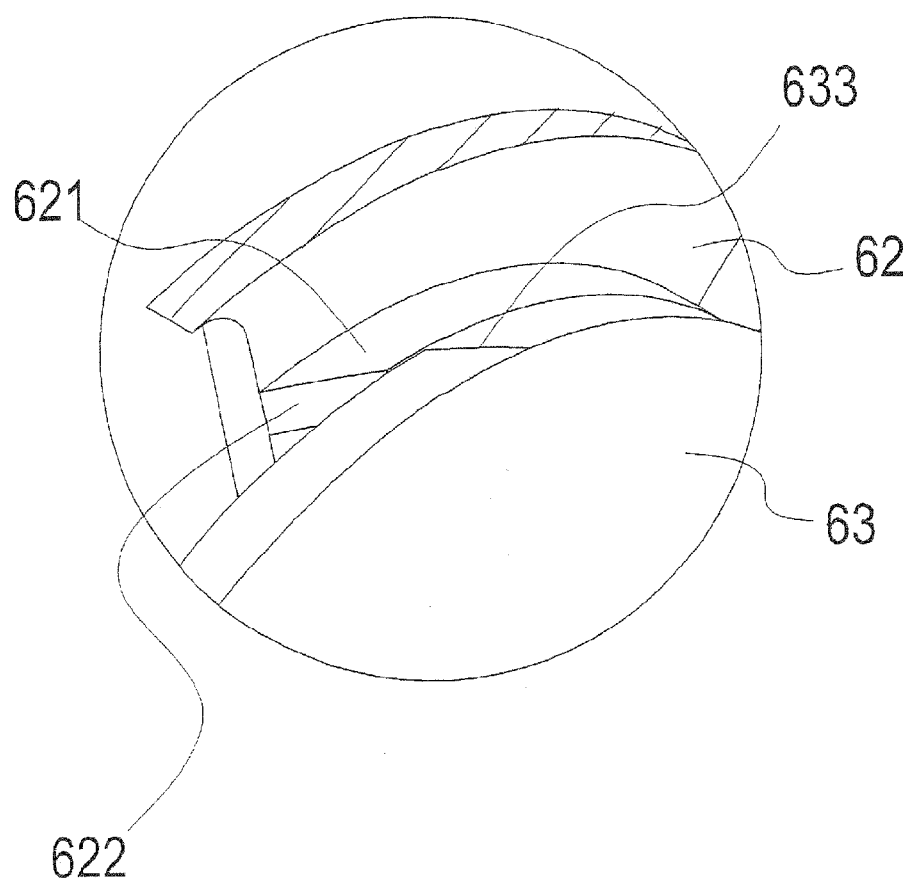
FIG. 9A is an enlarged view of a portion of FIG. 9.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 3, 3A, 4, 5, 5A, and 5B, which are respectively and sequentially a perspective view, an exploded view, another perspective view, a side elevational view, and another exploded view of a preferred embodiment of the present invention, a perspective view and a cross-sectional view showing an application of the present invention, and a perspective view demonstrating three-point balance according to the present invention, these drawings clearly show that the present invention uses a machine adjusting device to carry out angular adjustment of a wafer substrate 81 that is received in a reaction chamber 8 via a balance board 10. The machine adjusting device structurally comprises the following components:

A third fulcrum body 1 is set in engagement with an end portion of the balance board 10. The surface of the third fulcrum body 1 that is in engagement with the balance board forms a contact section 11. The contact section can be a contact surface or a contact spot.

A plurality of carrying bodies 2 each form a planar surface 21 at a predetermined location for supporting a predetermined portion of the balance board 10. The planar surface 21 forms therein a vertical hole 22. The vertical hole 22 communicates a receiving compartment 23. Each carrying body 2 has a side surface forming a horizontal hole 24 in communication with the receiving compartment 23.

A support post 3 is received in the vertical hole 22. The support post 3 has a side surface forming a slide slot 31. The slide slot 31 slidably receives therein a bar 32.

A support block 4 is received in the receiving compartment 23 and is set in contact engagement with the support post 3 and forms an inclined support surface 41 at the engagement portion thereof with the support post 3. The support block 4 forms an inner-threaded hole 42.

A rod 5 is received in the horizontal hole 24 and has an end coupled to the inner-threaded hole 42. The horizontal hole 24 comprises a plurality of rolling balls 51 received therein to interact with the rod 5.

A rotary adjustment assembly 6 is arranged at one side of each carrying body 2. The rotary adjustment assembly 6 is coupled to an end of the rod 5 that is distant from the inner-threaded hole 42. The rotary adjustment assembly 6 comprises a mounting base 61 that is securely mounted to the carrying body 2 and the mounting base 61 receives the rod 5 extending therethrough; a rotary switching member 62 that is circumferentially arranged around the mounting base 61, the rotary switching member 62 forming therein at least one rib 621 that is engageable with the mounting base 61, the rib 621 having an end forming a first slope surface 622; a toothed disk seat 63 that is attached to the mounting base 61 and receives the rod 5 to extend therethrough, the toothed disk seat 63 having a top surface forming teeth 631 distributed along a circumference thereof, the toothed disk seat 63 having a back surface forming at least one fixing section 632 that is in fixed engagement with the mounting base 61, the fixing section 632 forming at a predetermined location a second slope surface 633 that is interacting with the rotary switching member 62; a toothed disk 64 that is arranged on the toothed disk seat 63 and receives the rod 5 to extend therethrough, the toothed disk 64 having a bottom surface forming an engagement section 641 that engages the teeth 631, the toothed disk 64 forming therein at last one opening 642 in engagement with a projection block that will be described later; a spring plate 65 that is arranged on the toothed disk 64, the spring plate 65 receiving the rod 5 to extend therethrough; a rotary collar 66 that has a surface forming scale markings and forms therein a receiving compartment 661 for being fit over the mounting base 61, the toothed disk seat 63, the toothed disk 64, and the spring plate 65, the rotary collar 66 having an inside wall forming the projection block 662; and a hand grip 67 that is fit to the rotary collar 66 to be gripped by a user. The rotary collar 66 is provided with the scale markings 663, so that a user, when rotating the rotary collar 66, may simultaneously watch and read the scale markings 663 to take recording of the scale readings or to allow fast positioning in the next operation.

Further, each carrying body 2 comprises a shielding plate 7 attached to one side thereof distant from the rotary adjustment assembly 6.

Referring to FIGS. 1-9, which are respectively two perspective views, a side elevational view, and two exploded views of the preferred embodiment of the present invention, views showing an application of the present invention, a perspective view demonstrating three-point balance according to the present invention, and views demonstrating an operation of the preferred embodiment of the present invention, these drawings clearly show that to carry out adjustment of balance of the wafer substrate 81, the balance board 10 that is positioned between the third fulcrum body 1 and the carrying bodies 2 is adjusted by rotating the rotary adjustment assemblies 6 with the third fulcrum body 1 serving as a support reference. During the adjustment process, a user uses his or her hand to grip the hand grip 67, and then rotates the rotary adjustment assembly 6 (in other words, precise adjustment can be made with reference to the scale markings on the rotary collar 66 and the position of the marking is recorded to facilitate faster and more precise adjustment in the next balancing operation). Under this condition, the projection block 662 is set in engagement with a side wall of the opening 642 to cause rotation of the toothed disk 64. Meanwhile, the toothed disk 64 and the toothed disk seat 63 are allowed to interact with each other through the engagement section 641 to cause rotation of the rod 5 for carrying out fine adjustment. Also, the plurality of rolling balls 51 is caused to inter-engage with each other. The rotation of the rod 5 causes a minute displacement of the support block 4 that is in threadingly coupling with the rod 5. Due to the inclination of the support surface 41 of the support block 4, the support surface 41 slowly raises the support post 3 upwards. In the instant embodiment, when the support block 4 is moved inwards, the bottom of the support post 3 is caused to slide to an upper end of the inclined surface of the support block 4 so that the support post 3 is moved upward. On the other hand, if the bottom of the support post 3 is caused to slide to the lowest point of the inclined surface of the support block 4, the support post 3 is lowered down. Once a wafer 8 reaches a balanced condition, the rotary switching member 62 is turned to a locked condition (namely closed condition). In the locked condition, the first slope surface 622 of the rib 621 is set in engagement with and interlace with the second slope surface 633 to thereby pushing away the toothed disk seat 63, and meanwhile, the spring plate 65 undergoes deformation to depress the rotary collar 66 to provide a locking effect. On the other hand, if the rotary switching member 62 is turned to an open condition, the first slope surface 622 of the rib 621 disengages from the second slope surface 633 and the spring plate 65 pushes the toothed disk 64 sideward to allow of free rotation of the rotary collar 66.

Further, the balance board 10 uses the third fulcrum body 1 that functions as a third vertical support point and the carrying bodies 2 as two side support points to form a triangular planar surface. Due the contact section 11 of the third fulcrum body 1 being set in an inclined manner, the balance board is provided with a greater flexibility for adjustment to allow the third fulcrum body 1 and the carrying bodies 2 to reach the same balancing height. Afterwards, the carrying bodies 2 are employed to carry out adjustment of inclination angle for the balance board 10. In view of physics, when the third fulcrum body 1 is used as a vertical support point, the carrying bodies 2 can carry out height adjustment of the two sides of the balance board 10 to make the balance board 10 reaching a desired angle.

Figure 10:
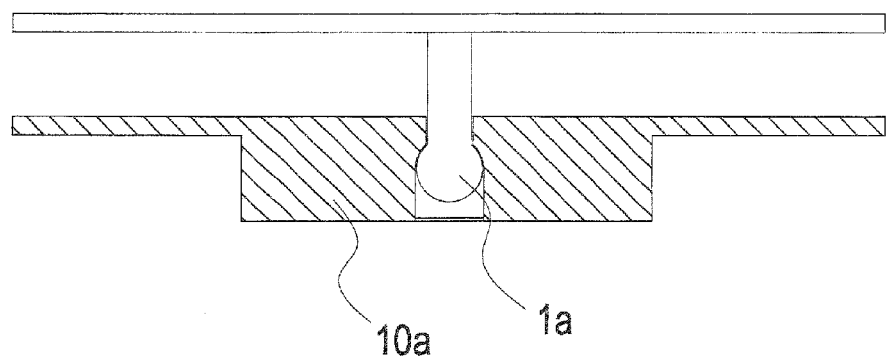
FIG. 10 is a schematic view illustrating an application of another embodiment of the present invention.
Figure 11:
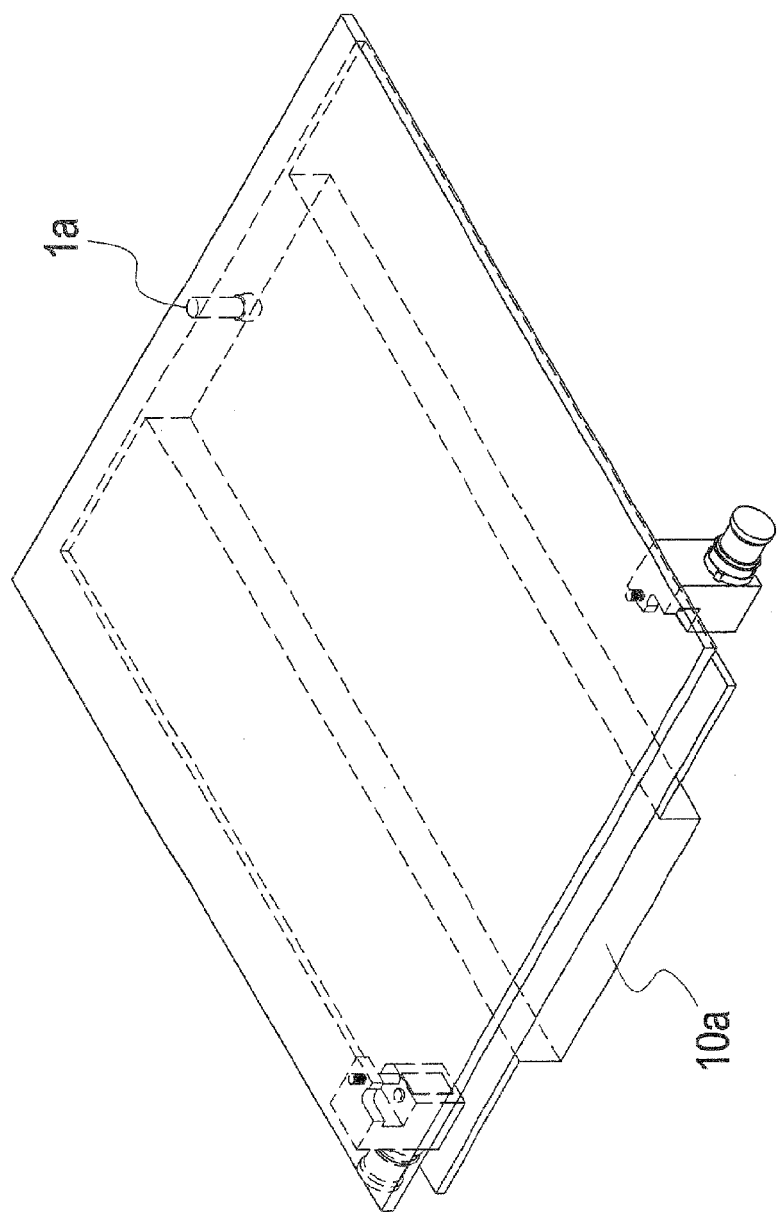
FIG. 11 is a schematic view illustrating an application of another embodiment of the present invention.

Referring to FIGS. 10 and 11, which are schematic views illustrating an application of another embodiment of the present invention, these drawings clearly show that a third fulcrum body 1a is provided in a form of spherical pivoting ball (ball joint), so that the third fulcrum body 1a is set in a pivotal engagement with the balance board 10a. As shown in FIG. 11, the balance board 10a forms an arrangement of three point support that allows of universal movement.

Thus, the adjusting device of wafer machine according to the present invention shows the following features for overcoming the drawbacks of the conventional techniques:

(1) With a three point balance realized through the third fulcrum body 1 (contact spot (ball joint) or contact surface (for overcoming the problems induced by fatigue of spring)) and two carrying bodies 2, ready adjustment of the balance condition of a wafer 9 can be realized with such a precision that cannot be achieved by the conventional techniques. Further, with the support post 3, the support block 4, the rod 5, and the rotary adjustment assembly 6 provided on each carrying body 2, balance of the whole wafer 9 can be readily achieved. Thus, such an efficient operation of adjusting and reaching a balanced position can be carried out without extra expense of time in the adjustment operation thereby accelerating the time of manufacturing process and providing extremely high precision and further effectively reducing the potential risk of damage caused by over-adjustment. Further, imbalance of thin film is also overcome.

(2) Costs are reduced and the lifespan of the machine is extended, so that the advantages achieved are not possible with the conventional techniques.

(3) The hand grip 67 of the rotary collar 66 is provided with markings to allow a user to record the marking position or reading where rotation is made for each wafer machine so that the optimum balance position of thin film can be directly set through rotation in the next operation.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A wafer machine adjusting device, which uses the machine adjusting device to realize angular adjustment of a wafer received in a reaction chamber via a balance board, the machine adjusting device comprising:
a plurality of carrying bodies, each of which forms a planar surface at a predetermined location for supporting a predetermined portion of the balance board, the planar surface forming therein a vertical hole, the vertical hole communicating a receiving compartment, each of the carrying bodies having a side surface forming a horizontal hole in communication with the receiving compartment;
a support post, which is received in the vertical hole;
a support block, which is received in the receiving compartment and is set in contact engagement with the support post, the support block forming an inner-threaded hole;
a rod, which is received in the horizontal hole and has an end coupled to the inner-threaded hole; and
a rotary adjustment assembly, which is arranged at one side of each of the carrying bodies, the rotary adjustment assembly being coupled to an end of the rod that is distant from the inner-threaded hole;
wherein the rotary adjustment assembly comprises:
a mounting base that is securely mounted to the carrying body, the mounting base receiving the rod extending therethrough;
a rotary switching member that is circumferentially arranged around the mounting base;
a toothed disk seat that is attached to the mounting base and receives the rod to extend therethrough, the toothed disk seat having a top surface forming teeth distributed along a circumference thereof, the toothed disk seat having a back surface forming at least one fixing section that is in fixed engagement with the mounting base;
a toothed disk that is arranged on the toothed disk seat and receives the rod to extend therethrough, the toothed disk having a bottom surface forming an engagement section that engages the teeth, the toothed disk forming therein at least one opening;
a spring plate that is arranged on the toothed disk, the spring plate receiving the rod to extend therethrough;

a rotary collar that has a surface forming scale markings and forms therein a receiving compartment for being fit over the mounting base, the toothed disk seat, the toothed disk, and the spring plate; and a hand grip that is fit to the rotary collar and adapted to be gripped by a user.

2. The wafer machine adjusting device according to claim 1, wherein the rotary switching member forms therein at least one rib that is engageable with the mounting base, the rib having an end forming a first slope surface.

3. The wafer machine adjusting device according to claim 1, wherein the fixing section forms at a predetermined location a second slope surface that is interacting with the rotary switching member.

4. The wafer machine adjusting device according to claim 1, wherein the rotary collar has an inside wall forming a projection block.

5. The wafer machine adjusting device according to claim 1, further comprising a third fulcrum body, the third fulcrum body being set in engagement with an end portion of the balance board, the third fulcrum body having a surface in engagement with the balance board and forming a contact section, the contact section being selectively a contact surface or a contact spot.

6. The wafer machine adjusting device according to claim 1, wherein the support post has a side surface forming a slide slot, the slide slot slidably receiving therein a bar.

7. The wafer machine adjusting device according to claim 1, wherein each of the carrying bodies comprises a shielding plate attached to one side thereof distant from the rotary adjustment assembly.

8. The wafer machine adjusting device according to claim 1, wherein the horizontal hole comprises a plurality of rolling balls received therein to interact with the rod.

9. The wafer machine adjusting device according to claim 1, wherein the support block forms an inclined support surface at the engagement portion thereof with the support post.

* * * * *